Feb. 23, 1926.
J. JOKISCH
1,574,095
ELECTRIC GENERATOR FOR MOTOR VEHICLES
Filed May 4, 1925     3 Sheets-Sheet 1
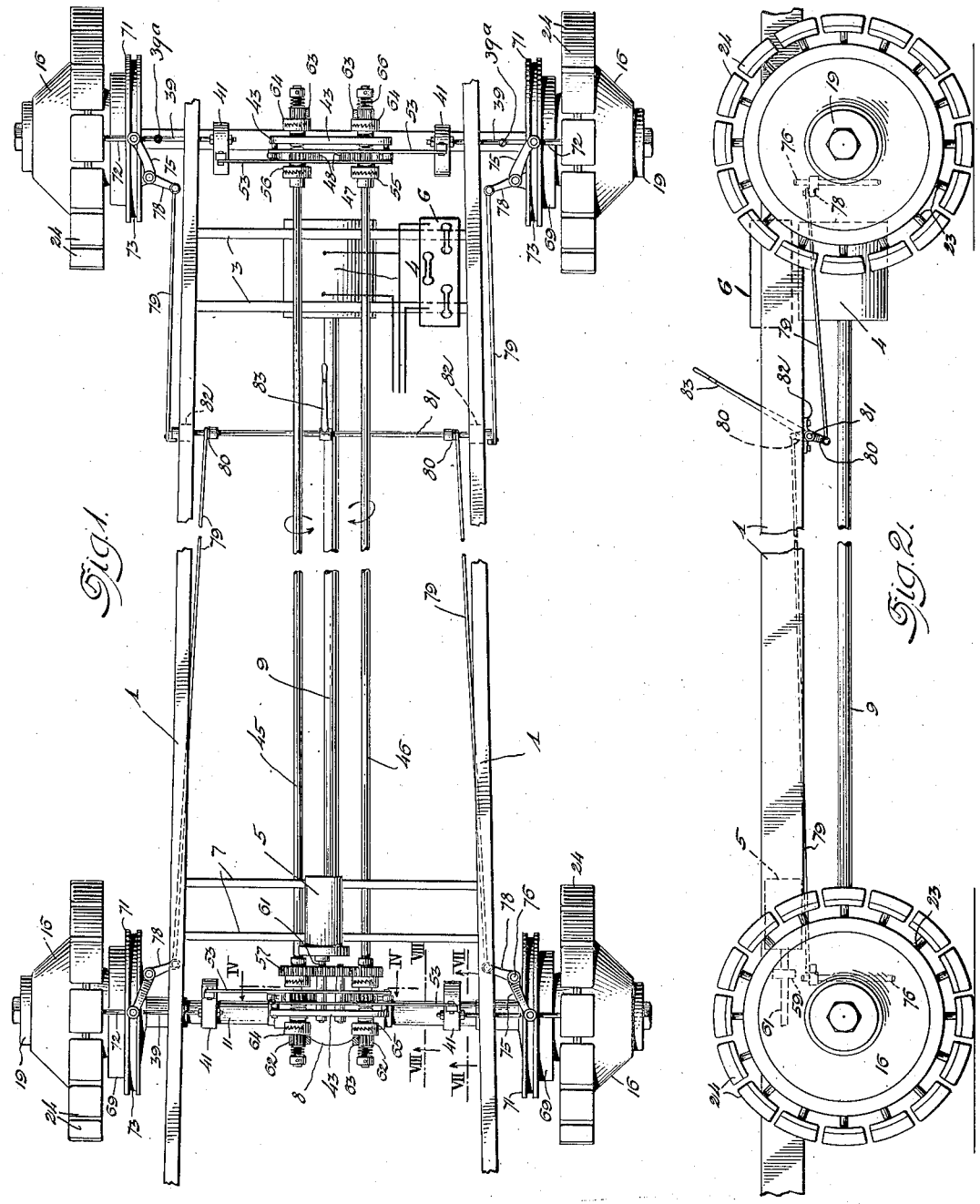
Inventor:
John Jokisch
By [signature]
Attorneys.

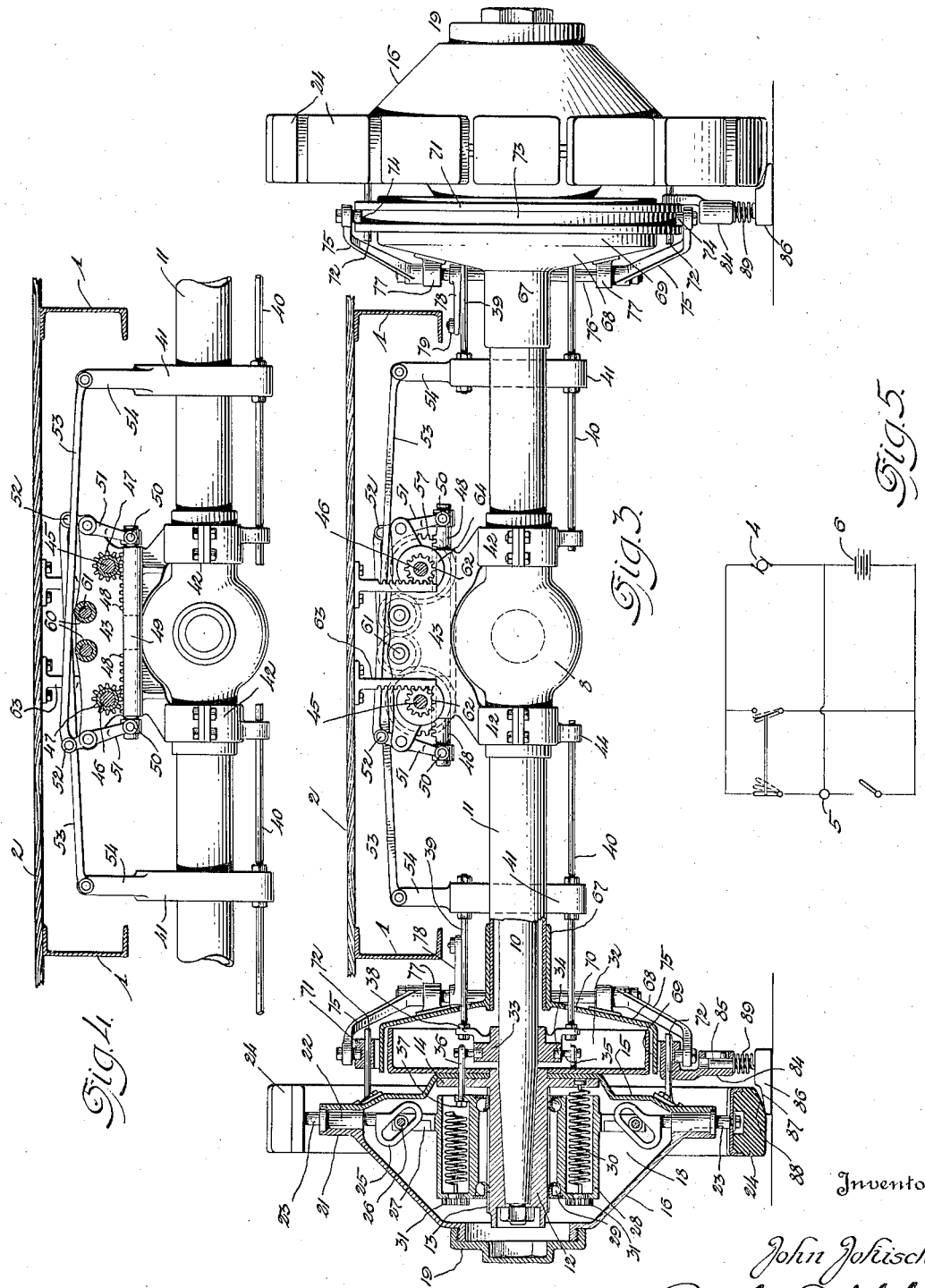

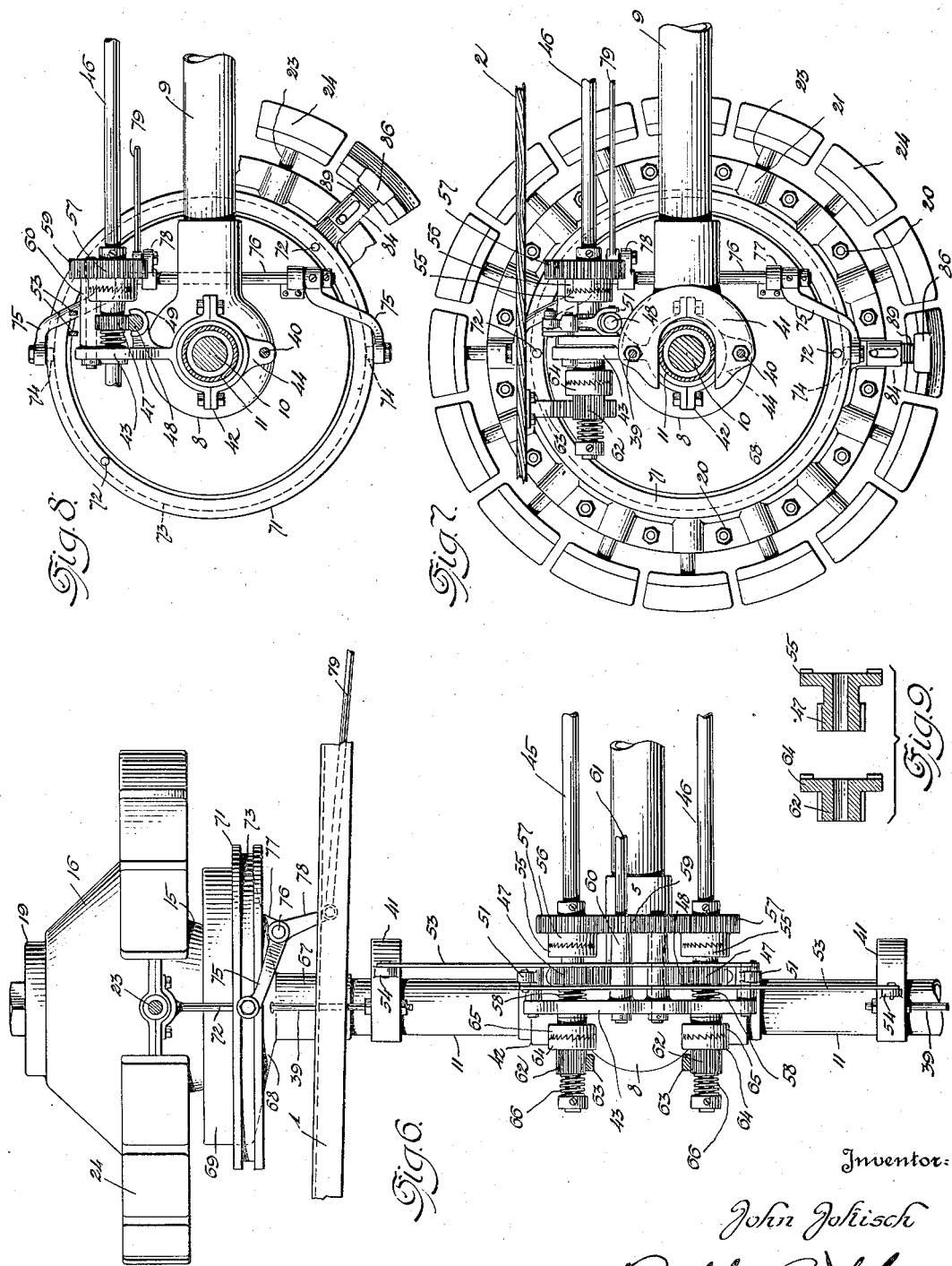

Patented Feb. 23, 1926.

1,574,095

UNITED STATES PATENT OFFICE.

JOHN JOKISCH, OF DETROIT, MICHIGAN.

ELECTRIC GENERATOR FOR MOTOR VEHICLES.

Application filed May 4, 1925. Serial No. 27,658.

*To all whom it may concern:*

Be it known that I, JOHN JOKISCH, a citizen of the United States, residing at Detroit, in the county of Wayne and State of Michigan, have invented certain new and useful Improvements in Electric Generators for Motor Vehicles, of which the following is a specification, reference being had therein to the accompanying drawings.

In my Patent No. 1,371,030, dated March 8, 1921, there is disclosed a resilient vehicle wheel having a yieldable periphery or tread which is resisted in its yieldableness by movable means disposed axially of the wheel in the body thereof, and it is by virtue of the mechanism disclosed in the above mentioned patent that a radial movement is converted into a reciprocable movement, which I have discovered may be utilized for generating power.

My invention aims to provide a motor driven vehicle with an electric generator adapted to be operated by utilizing any vertical movement of the vehicle for power generating purposes. It is a well known fact that a vehicle will at times encounter rough and irregular roads or streets causing vertical movement of the spring supported vehicle body relative to a chassis or running gear and when such roads or streets are encountered vibration is imparted to the chassis or running gear from the driven wheels of the vehicle. I utilize such wheel vibrations, in addition to the vehicle body vibrations, for generating power, and when smooth roads or streets are encountered, I provide means for causing wheel and body vibrations, so that at all times there may be a means of producing motion for power generating purposes.

My invention will be hereinafter specifically described and then claimed, and reference will now be had to the drawings wherein Figure 1 is a plan of a motor vehicle in accordance with this invention;

Fig. 2 is a side elevation of the same;

Fig. 3 is an enlarged rear elevation of the vehicle, showing one of the wheels thereof in longitudinal section;

Fig. 4 is an enlarged cross sectional view taken on the line IV—IV of Fig. 1;

Fig. 5 is a diagrammatic view of the electrical connections for the motor and generator;

Fig. 6 is an enlarged plan of a portion of the rear axle assembly;

Fig. 7 is an enlarged cross sectional view taken on the line VII—VII of Fig. 1;

Fig. 8 is a similar view taken on the line VIII—VIII of Fig. 1; and

Fig. 9 is a detail sectional view of shiftable ratchet members.

In the drawings the reference numerals 1 denote the side frames of a vehicle chassis adapted to support a body 2. The chassis side frames 1 are adapted to be supported from front and rear axle assemblies by suitable springs in the usual and well known manner and since all automobile bodies are subjected to vibration, particularly when the automobiles encounter rough and irregular roads, I have deemed it unnecessary to show the spring suspension between the chassis and the front and rear axle assemblies. These front and rear axle assemblies are substantially alike as far as my invention is concerned, with the exception that the rear axle assembly includes a well known type of differential mechanism, the front axle assembly a knuckle wheel steering arrangement and certain minor differences will hereinafter appear.

The chassis side frames 1 are connected by transverse members 3 supporting a conventional form of electric motor 4, and this motor has for its source of electrical energy a conventional form of generator 5 or a storage battery 6. By an arrangement of switches, shown in Fig. 5, the storage battery 6 may operate the motor; the generator may drive the motor and the generator may supply electrical energy to the storage batteries to change the same, this occurring when the automobile is descending a grade with the motor inactive.

The generator 5 is supported by transverse members 7 adjacent the rear axle assembly, which includes a differential mechanism 8 adapted to be operated by a longitudinally disposed motor drive shaft 9. The differential mechanism is adapted to operate axles 10 in the rear axle housing 11 and mounted on the outer end of each axle to rotate therewith is a wheel hub 12 having its periphery provided with longitudinal ways 13. At the inner end of each wheel hub is a peripheral flange 14 and suitably secured to said flange is an inner disk 15 cooperating with the outer disk 16 in forming a hollow wall body 18. The outer disk 16 has a detachable cap 19 and the inner and outer disks are detachably connected together, as at 20. The peripheral edges of the inner and outer disks are formed with radially disposed sockets 21 for bushings 22 and slidable in said bushings are short spokes or stems 23 having the outer ends thereof provided with detachable tread members 24 adapted to form the periphery of the wheel. The short spokes of stems 23 are reciprocable in the bushings 22 and the inner ends of said spokes are provided with angularly disposed slotted heads 25 into which extend antifriction rollers 26 supported in a slotted peripheral flange 27 of a casing 28 slidable longitudinally of the wheel hub 12. The casing 28 has end cages for anti-frictional balls 29 which are adapted to roll in the ways 13 of the hub 12. In the casing 28 are coiled springs 30 having end convolutions thereof connected to the flange 14 of the hub 12, as best shown in Fig. 3. The springs 30 are connected to the casing 28 by nuts 31 which permit of the tension of the springs 30 being increased or decreased. This mechanism is similar to that disclosed in my patent above referred to and it will be noted that when the spokes or stems 23 are shifted inwardly the casing 28 is shifted outwardly on the hub 12. When the spokes 23 are released by the tread members 24 moving out of engagement with the ground the retractile force of the springs 30 shifts the casing 28 inwardly, consequently there may be a reciprocation of the casing 28 during rotation of the wheel and when the wheel bounces by encountering a rough and irregular road.

Suitably attached to the inner disk 15 of the wheel is a brake drum 32 and loose on the axle 10, in the brake drum 32, is a collar 33 having a peripheral groove for anti-frictional rollers 34 carried by the inner ends of pins 35 attached to rods 36 extending through the brake drum 32, the inner disk 15 and the flange 14 so as to be attached to the casing 28, as at 37. The casing 28 and the collar 33 are adapted to move in synchronism and on the collar 33 are lugs 38 to which are attached rods 39 and 40. These rods are attached to a head 41 slidable on the rear axle housing 11, see Figs. 3 and 7, and mounted on the rear axle housing at the differential mechanism 8 are clamping portions 42 of vertically disposed bearings 43. The clamping portions 42 of said bearings have guides 44 for the rod 40, which are of greater length than the rods 39 and it is by virtue of these rods that the heads 41 and the collars 33 are prevented from rotating when the axle 10 is driven from the electric motor 4. The rods 39 of the front axle assembly have universal joints 39ª on account of the front steering wheels.

The front axle assembly is somewhat similar to the rear axle assembly and like reference numerals so applied thereto. In the bearings 43 of the front and rear axle assemblies are journaled longitudinally disposed parallel shafts 45 and 46, and considering the rear ends of these shafts, at the rear axle assembly, there are pinions 47 loose on said shafts, said pinions meshing with longitudinally disposed racks 48 slidable in guides 49 supported from the bearing 43. The outer ends of the racks 48 are operatively connected, as at 50, to cranks 51 pivotally supported from the bearing 43. The upper ends of the cranks 51 are pivotally connected, as at 52, to reach rods 53 which extend in opposite directions and are pivotally connected to posts 54 carried by the heads 41 slidable on the ends of the rear axle housing 11, as best shown in Figs. 3 and 4. It is now apparent that when the heads 41 are reciprocated from the casing 28 of the vehicle wheels that a similar motion is imparted to the racks 48 and the loose pinions 47 are rotated on the shafts 45 and 46.

The loose pinions 47 form part of ratchet members 55, one of which is shown in detail in Fig. 9, and these ratchet members are adapted to engage ratchet members 56 forming part of gear wheels 57 fixed on the shafts 45 and 46. The loose pinions 47 and their ratchet members 55 are normally held in driving relation with the ratchet members 56 by the expansive force of coiled springs 58 encircling the shafts 45 and 46 between the bearing 43 and the loose pinions 47. The springs 58 permit of the loose pinions receding when the ratchet members 55 are to ride over the ratchet members 56 to obtain another driving purchase therewith.

The gear wheels 57 mesh with a train of gear wheels 59 supported by extensions 60 of a bearing 43 and a gear of the train is mounted on a shaft 61 of the electric generator 5, as best shown in Fig. 1.

Thus far it will be apparent that when the vehicle is driven the radial movement of the wheel tread members 24 is converted into a reciprocable motion for the casings 28 and the heads 41 and that this reciprocable movement is converted into a rotary motion for the shafts 45 and 46 which drive the electric generator 5 supplying energy to the electric motor 4. The storage battery 6 may be brought into an operative circuit for the motor 4 when the vehicle is to be started and it is obvious that the storage battery 6 can be charged when the vehicle is descending a grade and that the storage battery may be used as an auxiliary or additional source of electrical energy when necessary.

To utilize vertical vibrations of the vehicle body 2 as power generating means, I provide the rear ends of the shafts 45 and 46 with loose pinions 62 and meshing with these pinions are depending racks 63 carried by the body 2. Forming part of the pinions 62 are ratchet members 64 normally meshing with ratchet members 65 fixed on the shafts 45 and 46. A driving relation between the ratchet members 64 and 65 is established by the expansive force of springs 66 carried by the rear ends of the shafts 45 and 46. See Fig. 6.

When very smooth roads or streets are encountered which would not materially set in motion the wheel tread members 24, I utilize obstructions in the form of blocks which are positioned so that the wheel tread members will be actuated. The construction contributing to this part of my invention is as follows;

At each end of each axle and fixed thereto is the hub portion 67 of a circular head 68 having a peripheral flange 69 surrounding the brake drum 32 and the head 68 is provided with openings 70 affording clearance for the rods 39 and 40. The head 68 cooperates with the brake drum 32 in providing an enclosure for the collar 33 and any brake mechanism that may be placed in the brake drum.

Loosely surrounding the annular flange 69 of the head 68 is a grooved ring 71 slidable on rods 72 carried by the inner disk 15 of the wheel. Extending into the groove 73 of the ring 71 are anti-frictional rollers 74 carried by cranks 75 on the ends of a vertically disposed rock shaft 76, said shaft being journaled in bearings 77 carried by the head 68. Each rock shaft 76 has a crank 78 and the four cranks are connected by reach rods 79 to the cranks 80 of a transverse rock shaft 81, journaled in bearings 82, carried by the chassis side frames 1. On the rock shaft 81 is a suitable operating lever or bolt 83 which may be actuated to swing the rings 71 to and from the inner sides of the vehicle wheels.

The lower edge of each shiftable ring 71 is provided with a guide 84 and slidably retained in the guide is a stem 85 of a block or shoe 86 having a beveled edge 87 adapted to engage a beveled edge 88 of one of the wheel tread members 24. The shoe or block 86 is attached to the guide 84 by a coiled retractile spring 89 adapted to hold the shoe normally elevated relative to the guide and against the beveled tread member 23, which is best shown in Figs. 3 and 7. By virtue of the rod 72 the ring 71 is caused to rotate with the wheel and consequently the shoe 86 is always at the inner edge of the beveled tread member 24 of the wheel. When the lever 83 is actuated to shift the ring 71 towards the wheel the beveled edge 87 of the shoe 86 rides down the beveled edge 88 of the tread member 24 causing the shoe 86 to be placed under the tread member and form an obstruction on the periphery of the wheel. This obstruction will cause a pumping or jarring action of the wheel as it is driven and it is this motion that ultimately results in the generation of power by the electric generator.

As pointed out in the beginning, the front axle assembly is very similar to the rear axle assembly, but since the generator 5 is located adjacent the rear axle assembly it is unnecessary to use the gear wheels 57 and the train of gears 59 at the forward ends of the shafts 45 and 46. The usual knuckles can be arranged in the brake drums 32 of the front axle assembly, or elsewhere, for steering purposes.

It is thought that the operation and utility of my invention will be apparent without further description, and while in the drawings there is illustrated a preferred embodiment of my invention, it is to be understood that the structural elements are susceptible to such variations and modifications as fall within the scope of the appended claims.

What I claim is:—

1. The combination of a vehicle chassis, front and rear axle assemblies, each axle assembly including axles, an electric motor adapted to drive the axles of the rear axle assembly, storage batteries adapted to supply electrical energy to said motor, wheels on the axles of each assembly, radially shiftable tread members carried by each wheel, a reciprocable casing in each wheel adapted to be reciprocated by movement of said tread members, an electric generator adapted to supply electric energy to said motor and storage batteries, longitudinal shafts extending from the rear axle assembly to the front axle assembly and adapted to operate said generator and ratchet mechanisms at the front and rear axle assemblies actuated by the reciprocable casings of said wheels adapted for driving said shafts.

2. The combination called for in claim 1, and ratchet mechanisms associated with said longitudinal shafts and actuated by vibrations of said chassis adapted to drive said shafts.

3. The combination called for in claim 1, and means adjacent the wheels of said front and rear axle assemblies adapted to be manually actuated to cause radial movement of the wheel tread members when said wheels are driven by said motor.

4. In a vehicle having a chassis, front and rear axle assemblies including wheel axles, an electric motor for driving the wheel axles of the rear axle assembly, a generator adapted to supply electrical energy to said motor, driving means extending from one axle assembly to the other and adapted for operating said generator, and wheels for the front and rear axle assemblies and adapted to operate said driving means, each wheel including radially movable tread members adapted to be actuated by said wheels being driven and the motion of said tread members transmitted to said driving means.

5. A vehicle as called for in claim 4, wherein the motion of the wheel tread members is transmitted to said driving means by a ratchet mechanism adjacent each axle assembly.

6. In a vehicle, axles and an electric motor for driving said axles, an electric generator for supplying current to said motor, a wheel on each axle, said wheel including a hub, a reciprocable casing thereon, radially shiftable tread members about said casing, means in said casing to resist shifting of said tread members, means supporting said tread members relative to said hub and casing, means for converting the reciprocable movement of said casing into a rotary motion for operating said generator, and means adjacent each wheel adapted to be manually adjusted to cause radial shifting of said tread members when the wheel is driven by said motor.

7. The combination of front and rear axle assemblies including axles, a chassis, an electric motor supported by said chassis and adapted to drive the axles of the rear axle assembly, a generator supported by said chassis and adapted to operate said motor, driving means for said generator extending from one axle assembly to the other, wheels for said axle assemblies, said wheels including radially shiftable tread members adapted to be set in motion when the axles of the rear axle assembly are driven by said motor, and means for transmitting motion from the shiftable tread members of said wheels to the driving means of said generator, said last mentioned means including reciprocable casings and ratchet mechanism associated with said driving means and operated by said reciprocable casings.

8. The combination of front and rear axle assemblies including axles, a chassis, an electric motor supported by said chassis and adapted to drive the axles of the rear axle assembly, a generator supported by said chassis and adapted to operate said motor, driving means for said generator and extending from one axle assembly to the other, wheels for said axle assemblies, said wheels including radially shiftable tread members adapted to be set in motion when the axles of the rear axle assembly are driven by said motor, means for transmitting motion from the shiftable tread members of said wheels to the driving means of said generator, and means adjacent each wheel adapted to be manually actuated to cause shifting of said wheel tread members when said vehicle is driven by said motor.

In testimony whereof I affix my signature.

JOHN JOKISCH.